May 1, 1951 R. D. HICKOK ET AL 2,551,561

FREQUENCY MODULATION DEVICE

Filed Aug. 20, 1949

INVENTORS
ROBERT D. HICKOK &
WALTER A. WEISS

BY

Hyde, Meyer, Baldwin & Doran

ATTORNEYS

Patented May 1, 1951 2,551,561

UNITED STATES PATENT OFFICE 2,551,561

FREQUENCY MODULATION DEVICE

Robert D. Hickok, Bratenahl, and Walter A. Weiss, Euclid, Ohio, assignors to Cleveland Patents, Incorporated, Cleveland, Ohio, a corporation of Ohio Application August 20, 1949, Serial No. 111,492

9 Claims. (Cl. 332—18)

This invention relates to frequency modulation devices, such as are used for varying the frequency in an oscillating circuit, and more particularly where the frequency is varied for the purpose of modulation and is accomplished by variations in inductance.

While the invention is capable of use in various ways in or in connection with frequency modulated transmitters or television apparatus, it has been developed and will be illustrated and described in a form suitable for use as a generator to produce frequency modulated waves having a definite and controllable variation for use by the radio and television manufacturer as well as for service stations engaged in the servicing and repair of such apparatus.

One object of the invention is to provide improved method and apparatus by means of which it is possible, in the operation of a modulation device, to secure straight line frequency response or any predetermined desirable departure thereof in either direction from the center frequency or resting position of the relatively movable inductance varying members.

Another object of the invention is to provide an improved frequency modulation method and device which produce and insure symmetrical frequency response above and below the center frequency or the resting position of the relatively movable inductance varying members.

Another object is to provide an improved frequency modulation device which includes two relatively movable members operatively associated with a coil of an oscillating circuit, at least one of which is made of magnetic material and more particularly the so-called powdered iron material, together with means for modifying the magnetic flux, and consequently the circuit inductance, as the members recede from or approach each other, in a manner and by an amount supplementary to the variation in that flux due alone to relative movement of said members, thereby securing the production of straight line frequency response over a fairly wide range of frequency change on either side of the center frequency.

Still another object is to provide an improved frequency modulating device of the character before described in which modification of the magnetic flux and inductance is secured by the use with an oscillating coil of a power absorption device in shunt form, so located and associated with relatively movable members of the appropriate form and size as to exert a constantly varying effect on the field, as the members recede from and approach each other, and thus modify the field flux and the inductance with the production of straight line frequency response, as aforesaid.

Another object is to provide an improved method of modulating the frequency in an oscillating circuit including an oscillating coil, consisting in producing motion in the magnetic field of a powdered iron mass, thus to cut lines of force without material hysteresis loss, and simultaneously, in said field, producing relative motion between said coil and a current conducting absorption member, thus to cut lines of force but here with hysteresis loss, thus producing uniform variation in inductance and straight line frequency response over a wide range of frequency variation.

Further objects of the invention in part are obvious and in part will appear more in detail hereinafter.

In the drawings, Fig. 1 represents, somewhat diagrammatically, one form of apparatus and circuits embodying the invention;

Figure 1:
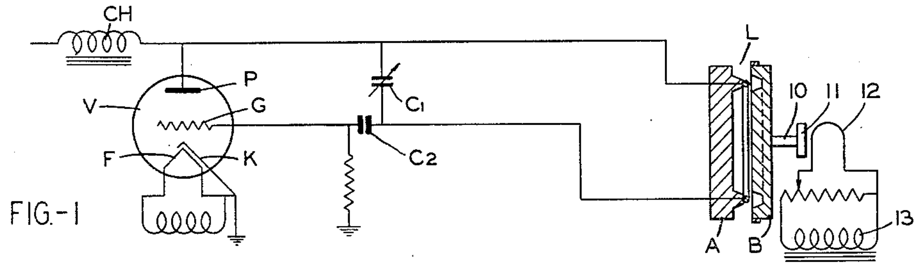

While the invention may be applied to any oscillatory circuit or circuits in which frequency modulation is desirable, the drawings illustrate conventionally a typical simple circuit for the purpose. Referring to Fig. 1, the circuit shown includes a suitable electronic tube V operating in conjunction with a variable inductor marked generally L and tuneable over a range of frequency by variable capacity C1. CH indicates a choke coil, C2 a blocking condenser, and P, G, K and F, the plate, grid, cathode and filament, respectively, of tube V.

The variable inductance L includes two members associated with a coil, at least one of which members is made of the well known ferro-magnetic material, consisting of finely divided or powdered iron particles having a diameter of from one to forty microns, distributed uniformly in a suitable cement or binder, enabling the mass to be molded into permanently hard form. Such an arrangement reduces or substantially eliminates the hysteresis losses due to eddy currents in the iron, as the binder prevents actual mechanical contact between the iron particles and there is no opportunity for closed circuit current flow. Any slight hysteresis loss which may actually occur is so slight as to be negligible.

The other member may be made of similar material, or may be in the form of a wire coil of suitable wire diameter and number of turns, and may be the oscillating coil itself.

These two members are relatively movable toward and from each other so as to vary the strength of the magnetic field between them when the circuit with which they are associated is in operation and thus vary the circuit inductance.

Either or both of the members may be moved so long as they are relatively movable toward and from each other, and their relative motion may be produced in any suitable manner.

It is well known that when, in the electromagnetic field of an oscillatory coil, a mass of magnetic iron material is moved to cut lines of force, and the magnetic material is of powdered iron form, eliminating eddy current losses, the inductance of the coil increases as the iron approaches the coil, or approaches its mate if it is one of a pair, with consequent decrease in frequency in the oscillatory circuit. The frequency response, under such conditions, is indicated by curve X in Fig. 5. Variation is not uniform, since the curve is not a straight line, but is convex upwardly.

It is further known that when, in the electromagnetic field of an oscillating coil, a metallic current conducting absorption member, made, for example, of brass or copper, in closed loop form, or in any form in which closed loop current flow may be produced, such as a copper plate, is moved to cut lines of force, the inductance of the coil decreases as the absorption member approaches the coil, with consequent increase in the frequency in the oscillating circuit. The frequency response, under such conditions, is indicated by curve Y, Fig. 5. Variation again is not uniform since the curve is not a straight line, but is concave upwardly.

Frequency modulators of the variable inductor type have been made in both forms, but never in a form where the frequency response is uniform or with straight line characteristics over a wide range of frequency on either side of the center frequency. In all cases, heretofore, a given increment of relative movement of the members from any center point toward each other, produces a different variation in inductance and frequency from that secured by a like increment of relative movement from the same center point away from each other.

Neither has it been possible to predetermine any desired departure, one way or the other, from straight line frequency response by preselection of the proper sizes, proportions, and arrangements of the members of the modulating couple or couples in such manner that one effect is used to offset or counterbalance a contrary effect.

According to our invention the frequency modulator is so formed and arranged that any departure from straight line frequency response in either direction is offset, counteracted or compensated for by coincident departure in the opposite direction, with consequent straight line effect or any desired departure therefrom.

Figs. 1 to 4 inclusive illustrate an arrangement in which the body parts of the two mated members of inductor L, marked respectively A and B, are both made of molded powdered iron. Member A is stationary and member B is movable, in this case by attachment to a stem 10 connecting it to an armature or core 11 vibrated by current flow in a coil 12 energized by secondary coil 13. The body parts of both members are of flat disc form, member A being provided on one of its faces with an annular rib 14 adapted to enter a corresponding groove 15 of member B. Upon the crest of the rib 14 of member A is mounted an oscillatory coil 16 of one, two or more turns of fine wire, said coil being in series with or forming part of the grid-to-plate oscillatory circuit of tube V. Upon the periphery of member B is mounted a closed current conducting loop 17, which for example may be of copper band form.

Our improved modulator thus includes two pairs of cooperating relatively movable inductance varying devices, one pair consisting of the powdered iron discs A, B which jointly cooperate with oscillatory coil 16, and the other pair consisting of said coil 16 and the closed absorption loop 17 which cooperates with it.

Figure 2:
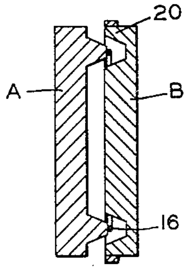
Fig. 2 is a detail sectional view, on a larger scale, of the relatively movable members, showing the same in center or resting position.
Figure 3:
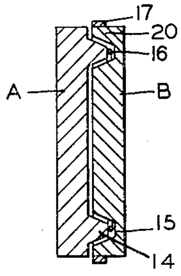
Fig. 3 is a similar view, showing said members in their close-approach position.

During vibration of member B by the motor coil 12, said member, including the absorption loop 17, travels from a position, Fig. 3, close to its mate, through the center position, Fig. 2, to its most remote position, Fig. 4, and back again, and so on.

Considering first the two discs A, B and their relation to coil 16, as member B vibrates back and forth lines of force of the magnetic field are cut and the strength of the flux rises and falls with consequent variation in inductance in coil 16. Omitting any influence of absorption loop 17, frequency response is graphically represented in curve X. This is convex upwardly, so that as the members separate more and more the rate of variation in inductance drops off. During such operation there is practically no hysteresis loss as the result of eddy currents, which are eliminated by the powdered metal form of the mated magnetic members.

On the other hand, considering alone the absorption loop 17 and its relation to oscillatory coil 16, as member B vibrates back and forth, carrying loop 17 with it, lines of force again are cut, but this time by loop 17. This is made of conducting material and is of such form as to permit the flow of current in a closed path within it. The loop consequently absorbs energy which is dissipated as heat. The effect again is to vary the inductance in coil 16. But this time the effect is in the opposite direction, as indicated graphically in the frequency response curve Y, Fig. 5, which is concave upwardly instead of downwardly as before.

Coupled with this is the fact that absorption loop 17 is so located on member B, and members A and B are so formed, that as vibration occurs, the magnetic field in which loop 17 travels opens and closes, or expands and contracts, as it were. The annular wall or flange 20 on the outside of groove 15 of member B, on which loop 17 is mounted, forms a shield or screen between coils 16, 17 variably effective as member B moves back and forth. In other words, when members A and B are close together, as in Fig. 3, the air gap between them is almost closed and the lines of force are short and direct between A and B. There is little room for the lines of force to spread or stray to loop 17, as it were.

In the center position, Fig. 2, the shielding effect is considerably reduced; the air gap is wider;

more lines of force stray and are intercepted by moving coil 17.

Figure 4:
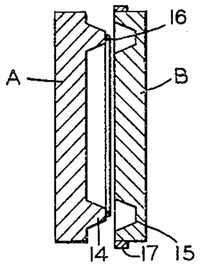
Fig. 4 is a similar view, showing said members in their widely separated position.

In the remote position, Fig. 4, the shielding effect is decreased. Here the two coils are fully open to each other, with the cutting of the maximum number of lines of force for any given increment of movement of member B.

By setting the loop to other positions on member B, such as at a point midway or elsewhere between its front and rear faces, or even upon the crest of its outer flange or wall, the total net effect of the loop may be preselected, as it were, to produce any desired compensation for the effect of the two iron masses A and B.

Similar variations in effect are produced by alterations in the sizes and shapes of the parts or by using different numbers of turns or coils of wire.

Figure 5:
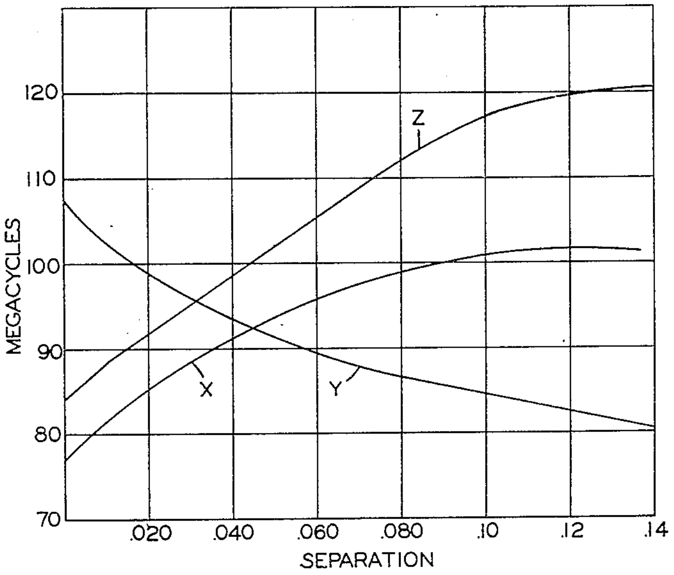
Fig. 5 is a diagram, illustrating frequency response.

The net result is that by selecting members A and B of the proper size and shape, and properly designing and placing coil 16 and loop 17, the two causes contributing to variation in inductance dependent upon motion in an inductor may be made to balance or to compensate for each other, with a resultant frequency response having straight line or other desirable characteristics over a fairly wide range of frequency, as indicated by curve Z, Fig. 5.

More important, straight line frequency response may be secured over the desired range of motion of separation between members A and B. In a typical instance, for example, this motion may be .048 thousandth of an inch on either side of a center position where the separation is .043 inch. In such case the frequency variation is 8 megacycles on either side of 100 megacycles, as indicated in curve Z.

It will of course be understood that the values for frequency and separation plotted in Fig. 5 are not exact but are merely illustrative.

While the invention is not limited to any particular sizes or proportions of parts, in one particular embodiment of the invention, made according to Figs. 1 to 4 and the description thereof, the discs A, B were 1.234 inches in diameter and approximately .150 inch thick. The absorption shunt coil, located as shown and made of brass, was .040 inch wide and .010 inch thick. Coil 16 contained 1½ turns of .031 inch copper wire.

Figure 6:
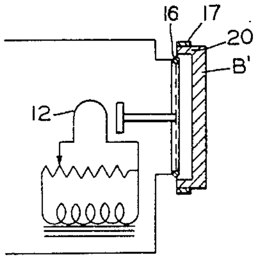
Fig. 6 is a detail sectional view, corresponding to Fig. 1, and showing another arrangement.

Fig. 6 illustrates another arrangement in which one member of the inductor couple, marked B', includes a flanged disc made of powdered iron and which supports the external absorption shunt loop 17. The other member here comprises the oscillatory coil 16 itself. This is vibrated by a suitable motor comparable to that in Fig. 1, while member B' is stationary. A similar masking or shielding effect is produced as coil 16 moves back and forth, accompanied by variations in inductance caused by two similar sources, one, by relative motion between coil 16 and disc B', without hysteresis loss, and two, caused by relative motion between coil 16 and absorption shunt 17, with hysteresis loss. Here, as in Fig. 1, the outer wall or flange 20 of member B' forms a mask or shield between coil 16 and loop 17.

Other arrangements embodying the invention will be apparent to those skilled in the art.

Of course, in any form, the invention is not restricted to the production of exact straight line frequency response, but embraces any method or device, within the scope of the claims, in which the two opposing tendencies or effects are produced, one producing hysteresis loss and the other being effective without such loss, even though the ultimate frequency response involves some predetermined desirable departure from straight line characteristics.

In all forms, vibration of the movable part or parts produces variation in inductance in the oscillatory coil or circuit of such nature that the frequency response is at a uniform or desirable rate over a wide range of frequency. The construction and mode of operation are simple and both the modulator and the method of its operation are simple but nevertheless quite accurate, definite and dependable.

Further advantages of the invention will be apparent to those familiar with the art.

What we claim is:

1. Apparatus for producing straight line frequency response on each side of a base frequency in a frequency modulated oscillatory circuit, said apparatus comprising an inductance and a magnetic element of low hysteresis loss characteristics in association with said inductance, means for producing relative reciprocatory motion between said inductance and said element, a magnetic flux absorption member fixed with respect to said element, whereby when said circuit is energized and said reciprocatory motion is produced as aforesaid, relative approach and withdrawal movement between said inductance and said magnetic element tends to vary the frequency in the oscillatory circuit, but such tendency is opposed and compensated by simultaneous approach and withdrawal movement between said inductance and said absorption member.

2. Apparatus as defined in claim 1 wherein said inductance is fixed in position, and means is provided for simultaneously moving said absorption member and said magnetic element towards and from said inductance.

3. Apparatus as defined in claim 1 wherein said absorption member consists of a closed loop of metallic material fixed on said magnetic element.

4. Apparatus as defined in claim 1 wherein said magnetic element consists of non-conducting material with finely divided iron particles dispersed therein.

5. Apparatus as defined in claim 1 wherein said variable inductance couple consists of two discoidal members, one carrying said inductance and the other carrying said absorption member, the last such member having a recess opening towards the other such member, said recess being so disposed that relative movement between said members causes movement of said inductance into and out of said recess.

6. Apparatus for producing straight line frequency characteristic response on each side of a base frequency in a frequency modulated oscillatory circuit, said apparatus comprising a variable inductance couple consisting of a pair of relatively movable members, an inductance coil carried on a first said member, a magnetic flux absorption element carried on a second said member, the second said member being a non-conducting base material with finely divided iron particles dispersed therein, and means for producing relative reciprocatory motion between said members.

7. Apparatus as defined in claim 6 wherein said magnetic flux absorption element is a closed loop of flux conducting material.

8. Apparatus as defined in claim 6 wherein said members are of generally disc form, lying in parallel planes, the coil-carrying member having an annular rib thereon, said coil being disposed on said rib, the other said member having an annular depression therein complementary to said rib whereby relative movement between said members produces alternative insertion and withdrawal of said rib into said depression.

9. Apparatus as defined in claim 6 wherein both said members are formed of non-conducting base material having finely divided iron particles dispersed therein.

ROBERT D. HICKOK.
WALTER A. WEISS.

REFERENCES CITED

The following references are of record in the file of this patent:

UNITED STATES PATENTS

| Number | Name | Date |
|---|---|---|
| 2,353,162 | Kaltenbacher | July 11, 1944 |
| 2,402,948 | Carlson | July 2, 1946 |